United States Patent
Ichino

(10) Patent No.: US 8,036,540 B2
(45) Date of Patent: Oct. 11, 2011

(54) OPTICAL TRANSMITTER SUPPRESSING WAVELENGTH DEVIATION AT BEGINNING OF OPERATION

(75) Inventor: Moriyasu Ichino, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 842 days.

(21) Appl. No.: 12/073,805

(22) Filed: Mar. 10, 2008

(65) Prior Publication Data

US 2008/0226296 A1      Sep. 18, 2008

(30) Foreign Application Priority Data

Mar. 15, 2007   (JP) ................. 2007-067112

(51) Int. Cl.
*H04B 10/04* (2006.01)
*H01S 3/00* (2006.01)
(52) U.S. Cl. ............... 398/196; 398/193; 372/38.01
(58) Field of Classification Search ............... 398/193, 398/196; 372/38.01
See application file for complete search history.

(56) References Cited

U.S. PATENT DOCUMENTS

| 5,978,395 A | 11/1999 | Nomura | |
|---|---|---|---|
| 2003/0033819 A1* | 2/2003 | Prescott | 62/3.7 |
| 2004/0161248 A1* | 8/2004 | Stewart et al. | 398/196 |
| 2008/0047278 A1* | 2/2008 | Saad et al. | 62/3.7 |

FOREIGN PATENT DOCUMENTS

JP      2003-298524      10/2003

* cited by examiner

*Primary Examiner* — Nathan Curs
(74) *Attorney, Agent, or Firm* — Smith, Gambrell & Russell, LLP

(57) ABSTRACT

An optical transmitter is disclosed in which the wavelength deviation occurred at the turning on from the disabled state to the enabled state by the negating of the Tx_Disable command is suppressed. The optical transmitter includes a semiconductor laser diode (LD) and an automatic temperature controller (ATC) circuit to drive the thermo-electric cooler (TEC). When the transmitter receives the Tx_Disable to start up the operation of the LD, a pulsed signal is generated in synchronizing with the transition of the Tx_Disable signal to momentarily enhance the cooling capacity of the TEC in order to compensate the increase of the temperature of the LD by the self heating, which prevents the output wavelength of the transmitter from deviating.

11 Claims, 8 Drawing Sheets

OPTICAL TRANSMITTER SUPPRESSING WAVELENGTH DEVIATION AT BEGINNING OF OPERATION

BACKGROUND OF THE INVENTION

Field of the Invention

The present invention relates to an optical transmitter, in particular, an optical transmitter with an automatic temperature controller for a semiconductor laser diode to make an output wavelength constant.

The wavelength division multiplexing (WDM) system for an optical communication is to increase a transmission capacity by multiplexing a plurality of signal channels each having a specific wavelength different from each other. An optical transmitter applied to the WDM system is necessary to selectively output a signal with a wavelength unique to the channel thereof among channels in the WDM system. However, a laser diode, which is generally used in the optical transmitter for the WDM system, shows a strong dependence on a temperature in an output wavelength thereof. Thus, the optical transmitter is inevitable to control the temperature of the LD precisely.

FIG. 8 is a block diagram on a conventional optical transmitter 100 that includes an optical module comprising an LD 102, a thermistor that senses a temperature of the LD 102, and the thermo-electric cooler (TEC) 106 to control the temperature of the LD 102. This optical module 108 often called as a transmitter optical sub-assembly (TOSA). The optical transmitter 100 further comprises a TEC driver 112 to provide driving current to the TEC 106, a processing unit (CPU) 114 to generate a target signal ST0 corresponding to a target temperature of the LD 100, a digital-to-analog converter (D/A-C) 116 that converts the digitally target signal ST0 to an analog signal, and a comparator 118 to generate a differential signal STD between the target signal ST0 and the sensed signal ST1. The TEC driver provides the driving current to the LD 102 based on the differential signal STD. The closed loop of the LD 102, the thermistor 104, the processing unit 114, the D/A-C 115, the comparator 118 and the driver 112 constitute an automatic temperature control (ATC) circuit 108 for the LD 102, which maintain the temperature of LD constant, because the ATC circuit operates so as to equalize the sensed signal ST1 with the target signal ST0 by an enough voltage gain of the comparator 118.

The optical transmitter 100 further provides an LD driver 110 to provide a driving current to the LD 102. The LD driver 110 receives a transmitting signal Tx and a command Tx_Disable from the outside of the transmitter 100. The command Tx_Disable enables or disables the emission of the LD 102. When the transmitter 100 receives the assertion of the Tx_Disable, the LD driver 110 fully shuts down the current to the LD 102.

U.S. Pat. No. 5,978,395 has disclosed an optical transmitter with a function to shut the driving current down when the LD temperature deviates from a target value to prevent the failure in the wavelength from affecting neighboring channels. A Japanese Patent Application published as JP-2003-298524 has disclosed an optical transmitter in which the LD emits signal light after the temperature thereof reaches the target value specific to the signal channel and becomes stable thereat.

When the optical transmitter changes its mode from the disable state to the enable state by the command negating the Tx_Disable, the self-heating by the current provided to the LD causes the deviation of the temperature of the LD, until the automatic temperature control practically operates, even it is kept stable at the target temperature. This causes the deviation of the output wavelength of the LD and possibly affects the operation in the neighbor channel in the WDM system.

SUMMARY OF THE INVENTION

The present invention is to provide the subject above that the output wavelength of the LD temporarily deviates from the target value when the LD is initially operated even the temperature of the LD is kept at the predetermined value.

One feature of the present invention relates to an optical transmitter that has a function to enable or to disable an optical output in synchronized with a command provided from the outside of the transmitter. This optical transmitter includes a semiconductor laser diode, a feedback loop to control a temperature of the laser diode automatically, which is often called as an automatic temperature control (ATC) loop, and a unit to suppress a temperature deviation of the laser diode, when the optical transmitter is enabled by the external command, by superposing a pulsed signal momentarily on the feedback loop. The ATC loop may include a thermoelectric cooler (TEC) that mounts the laser diode thereof, a temperature sensor to sense the temperature of the laser diode, and a processing unit that compares the monitored temperature with a reference and provide a driving current to the TEC based on the comparison.

The pulsed signal superposed on the feedback loop momentarily increases a current supplied to the TEC which may compensate the temperature deviation of the laser diode due to the self-heating by the current provided to the laser diode in synchronized with the enable command. The unit to suppress the temperature deviation may include an attenuator to attenuate the external command and a differentiator to form the pulsed signal, while the processing unit within the ATC loop may include a comparator to compare the sensed temperature with a reference and a driver to provide a current to the TEC based on the comparison by the comparator. The pulsed signal may be superposed either on the reference or the sensed temperature, or on the comparison result.

Another aspect of the present invention relates to a method to control the temperature of the laser diode, in particular, the method relates to compensate the temperature deviation of the laser diode when the laser diode start to operate and raise the temperature thereof by the self heating due to the current provided thereto. The method may comprise steps of, first setting the temperature of the laser diode to be a preset value that corresponds to a specific wavelength of the optical output by the thermo-electric cooler, second receiving an external command to enable the laser diode, and third, in responding to the external command, concurrently providing a current to the laser diode and a pulsed current to the thermo-electric cooler to compensate a self-heating of the laser diode due to the current provided thereto. Thus, the wavelength deviation at the start of the operation due to the driving current may be compensated by momentarily enhancing the cooling capacity of the TEC by the pulsed current, even the temperature of the laser diode is kept to the preset value in a condition with no driving current.

DESCRIPTION OF PREFERRED EMBODIMENTS

Next, embodiments of an optical transmitter according to the present invention will be described as referring to accompanying drawings. In the description of drawings, the same elements will be referred by the same symbols or the same numerals without over lapping explanations.

Figure 1:
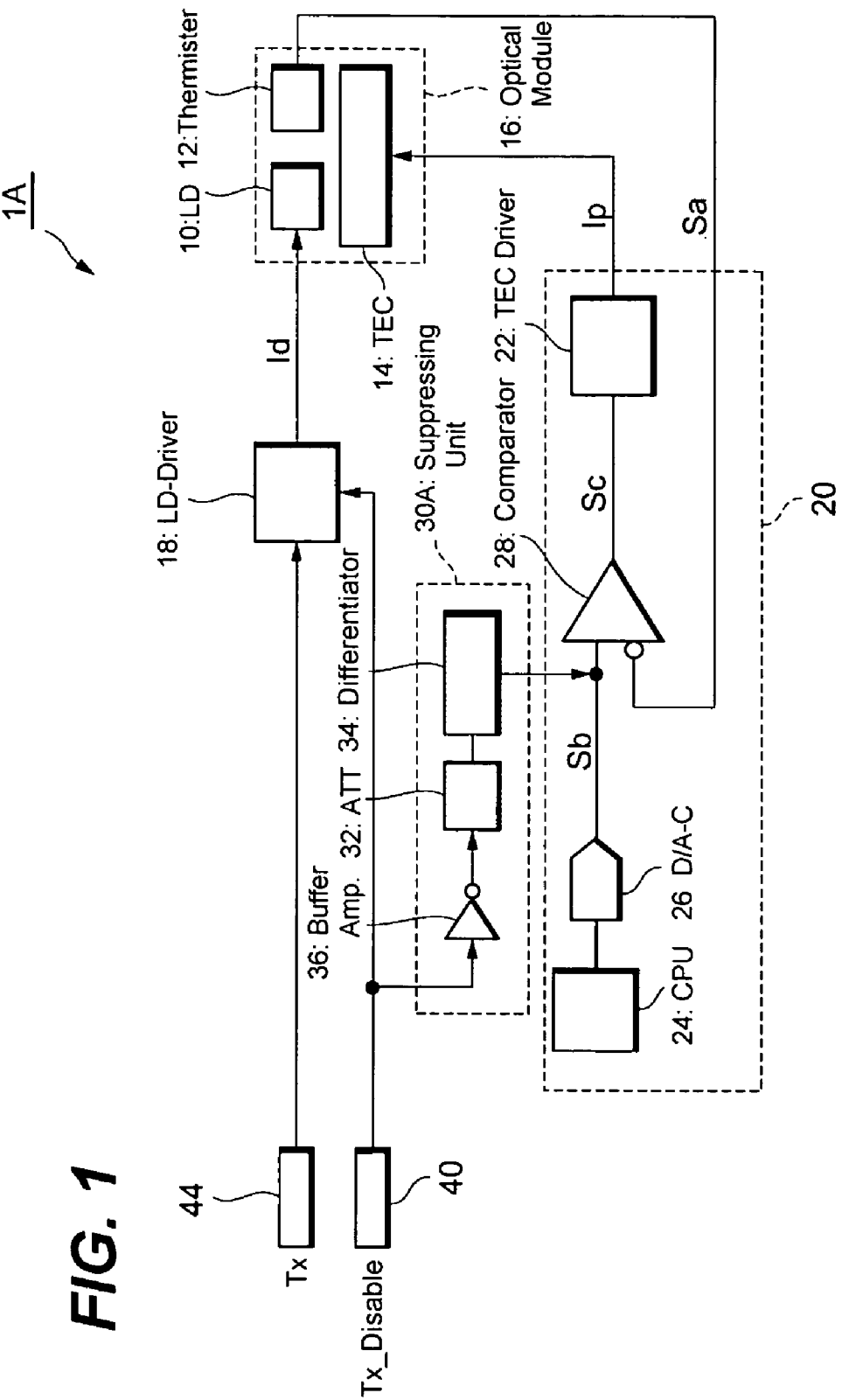
FIG. 1 is a block diagram of an optical transmitter according to an embodiment of the present invention.

FIG. 1 is a block diagram of an optical transmitter 1A according to an embodiment of the present invention. The optical transmitter 1A provides an optical module 16, which is often called as a transmitter optical sub-assembly (TOSA), that installs a laser diode (LD) 10, a thermistor 12, and a thermo-electric controller (TEC) 14. The thermistor 12 senses a temperature of the LD 10 to generate a monitoring signal Sa that decreases when the sensed temperature increase. The TEC 14, which mounts the LD 10 thereon, lowers and raises a temperature of the LD 10 depending on the driving current Ip in the magnitude and the direction thereof.

The optical transmitter 1A further provides a control unit 20 to provide the driving current Ip to the TEC 14. This control unit 20 includes the TEC driver 22, the CPU 24, the digital-to-analogue converter (D/A-C) 26 and the amplifier 28. The CPU 24 and the D/A-C 26 generates a signal Sb corresponding to the target temperature of the LD 10. This target temperature is equivalent to a channel wavelength assigned to the optical transmitter 1A in the WDM communication system, and is held in the CPU 24. The amplifier 28 is configured to receive the monitoring signal Sa in the non-inverting input thereof, while, the signal Sb in the inverting input, to compare these two signals and to generate a resulting signal Sc, which is substantially equal to a difference between two signals, Sa and Sb. The TEC driver 22 generates the driving current Ip corresponding to the resultant signal Sc and provides this current Ip to the TEC 14.

The optical transmitter 1A further provides an input terminal 44 to receiver a transmitting signal Tx to modulate the LD 10, a terminal 40 to receiver a disable signal Tx_Disable, and a laser driver 18 to generate a current Id to provide it to the LD 10. The disable signal, Tx_Disable, forcibly turns off the LD 10. The LD driver 17 provides the current Id only when the disable signal, Tx_Disable, is inactive, while, it fully stops the provision of the current Id to the LD 10.

The optical transmitter 1A provides a unit 30A to suppress the fluctuation of the output wavelength. This unit 30A increases the driving current Ip for the TEC 14 when the disable signal Tx_Disable turns from the disable state to the enable state. The unit 30A comprises a buffer amplifier 36 whose input terminal receives the signal Tx_Disable, an attenuator (ATT) 32 and a differentiator 34.

Figure 2:
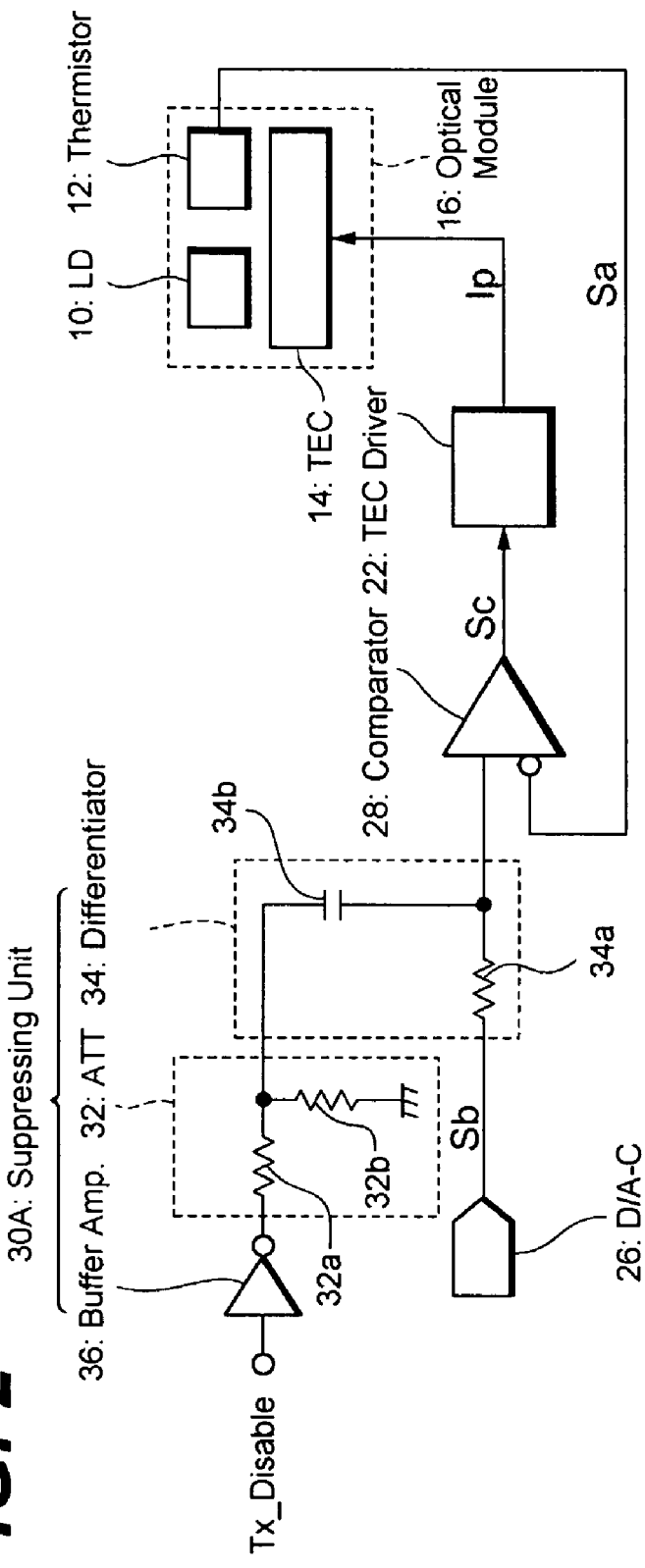
FIG. 2 specifically illustrates a suppressing unit according to the embodiment of the invention.

FIG. 2 illustrates a circuit diagram of the unit 30A. Referring to FIG. 2, the ATT 32 includes to resistors, 32a and 32b, one of which 32a is connected to the buffer amplifier 36, while the other resistor 32b is connected between the former resistor 32a and the ground. The differentiator 34 includes a resistor 34a and a capacitor 34b. The resistor 34a is inserted between the output of the D/A-C 26 and the non-inverting input of the amplifier 28, while, the capacitor 34b is connected between the ATT 32 and the non-inverting input of the amplifier 28. Thus, the transition of the disable signal Tx_Disable may be reflected in the non-inverting input of the amplifier 28, that is, the disable signal Tx_Disable may be superposed by a pulsed form to the signal Sb corresponding to the target temperature, which varies the driving current Ip for the TEC 14.

Figure 3:
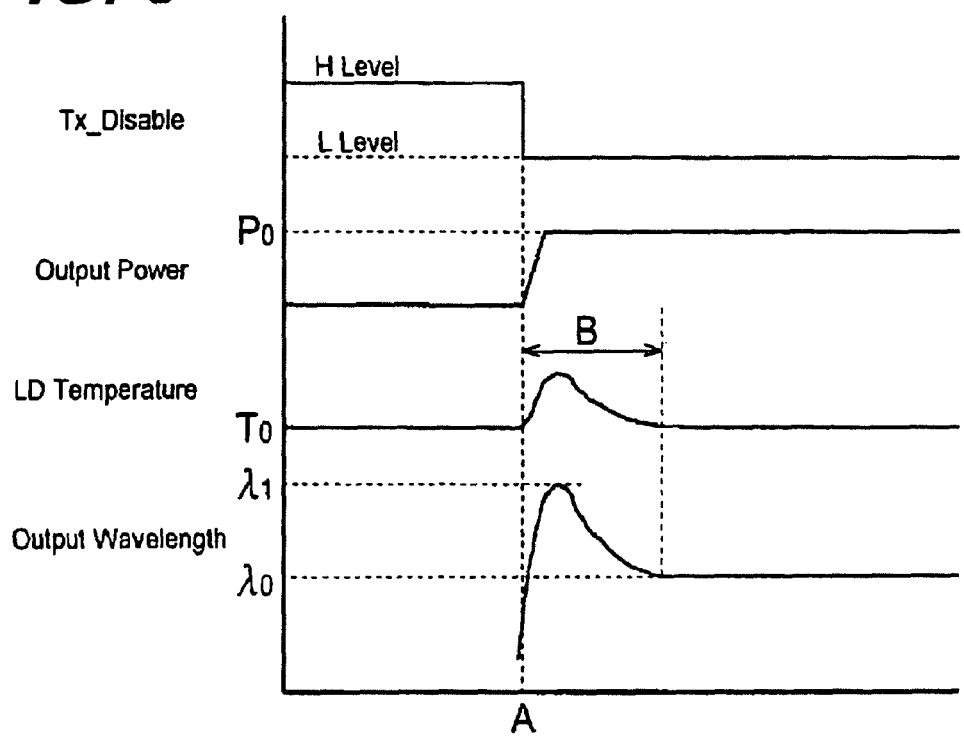
FIG. 3 shows time charts of the disable command Tx_Disable, the optical output, the LD temperature, and the output wavelength obtained in the conventional optical transmitter without any suppressing unit.
Figure 8:
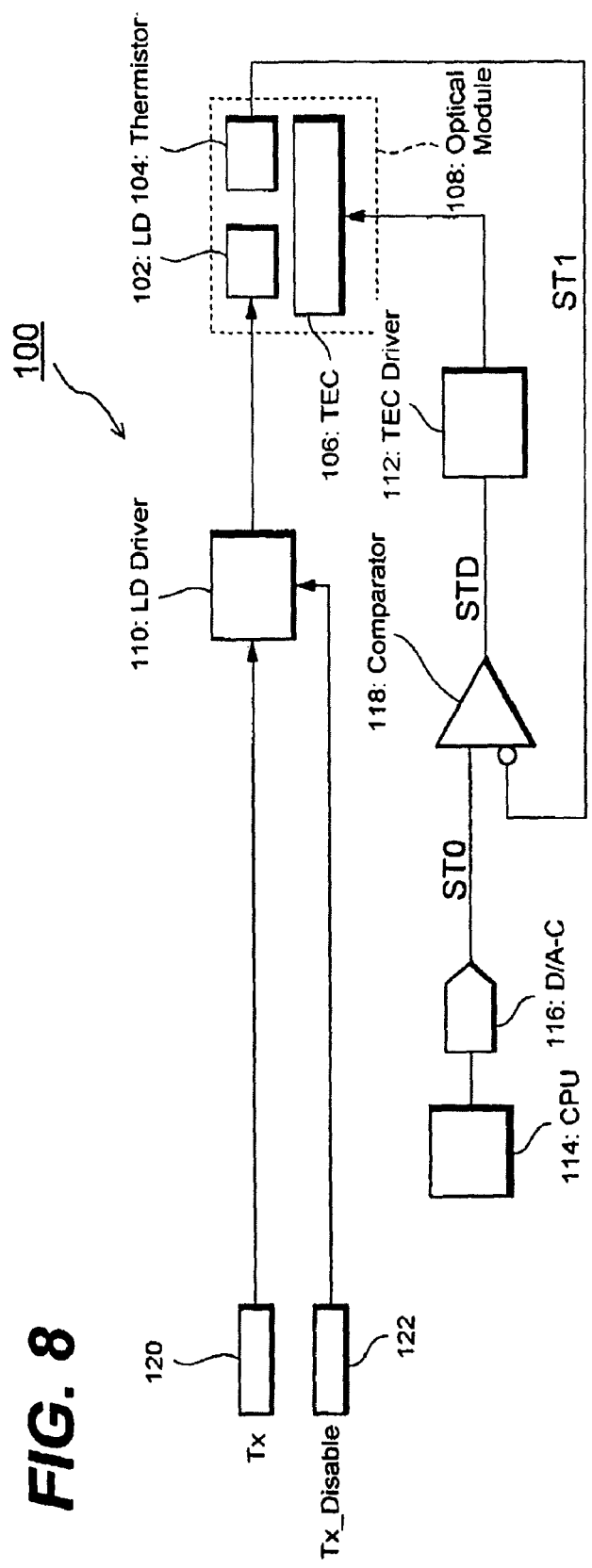
FIG. 8 is a block diagram of a conventional optical transmitter without any suppressing unit.

Next will explain the subjects appeared in the conventional optical transmitter as comparing the function of the present invention. FIG. 3 shows time charts of the conventional optical transmitter shown in FIG. 8, where FIGS. 3A to 3D show a disable signal Tx_Disable, the output power of the LD, the temperature of the LD, and the output wavelength of the LD, respectively. The disable signal Tx_Disable turns to the enable state at the time A in the figure, the LD begins to emit light. Although the LD is practically modulated by the modulation current, FIG. 3 illustrates the output power of the LD as the constant value P0.

Synchronizing with the beginning of the emission, the power consumption by the LD abruptly increases, in other words, the temperature of the LD temporarily increases even though it stably keeps the target temperature T0 until the beginning of the emission. Subsequently, the thermistor detects the this temperature increase, and the TEC driver controls, be receiving the output of the thermistor, the driving current Ip so as to set the temperature of the LD to be equal to the target value T0. However, there is substantial delay from the increase of the temperature to the stable state at the target value T0. Accordingly, the output wavelength of the LD fluctuates from the preset value $\lambda 0$ to a longer wavelength $\lambda 1$.

Figure 4:
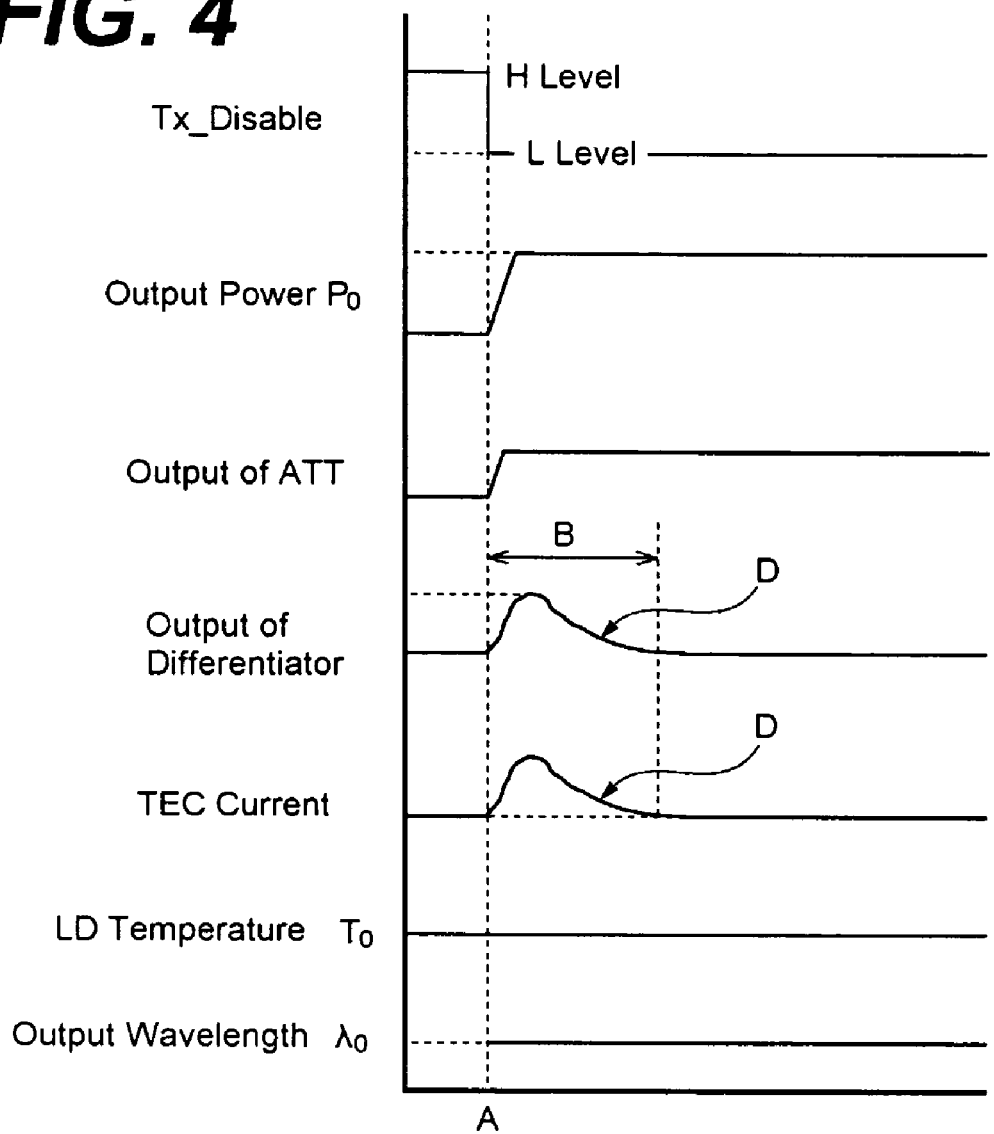
FIG. 4 is time charts of the disable command Tx_Disable the optical output, the output of the attenuator, the output of the differentiator, the TEC driving current, the LD temperature and the output wavelength according to the present embodiment.

FIG. 4 shows the time charts of the signals, the disable signal Tx_Disable, the output power of the LD, the output from the ATT 32, the output from the differentiator 34, the driving current Ip, the temperature of the LD, and the output wavelength of the LD, respectively, in the optical transmitter 1A according to the present invention. Similar to the conventional setup, the disable signal Tx_Disable turns to the enable state at the instance A and the LD begins to emit.

The disable signal Tx_Disable also enters the ATT 32 of the suppressing unit 30A to suppress the wavelength shift. The ATT 32 attenuates the disable signal Tx_Disable. This attenuated signal enters the differentiator 34 and the differentiator 34 generates a signal pulse D with a width of B and a peak height Vp. The leading edge of the pulse D traces the output of the ATT 32 and the falling edge thereof is primarily determined by a time constant of the resistor 34a and the capacitor 34b, while, the height Vp may be determined by the attenuation factor of the ATT 32, and the time constant above. This pulsed signal D superposed on the target signal Sb enters the non-inverting input of the amplifier 28. Accordingly, the output Sc of the amplifier includes a component corresponding to this pulsed signal D, which temporarily increases the driving current Ip synchronized with the negation of the Tx_Disable.

Thus, the capacity of the TEC 14 to cool down the temperature of the LD 10 momentarily increases just after the timing A, which suppresses the temperature increase of the LD 10 due to the raised power consumption thereof and keeps the temperature around the target value T0. The output wavelength of the LD 10 may be also maintained at the predetermined value $\lambda_0$, as shown in FIG. 4.

The suppressing unit 30A for the wavelength shift may provide the ATT 32 to attenuate the disable signal Tx_Disable and the differentiator 34 to generate the single pulsed signal synchronized with the leading or falling edge of the disable signal. This two step process for the disable signal Tx_Disable may optionally vary the width and the height of the pulsed signal, and the driving current Ip for the TEC may be widely arranged by superposing this pulsed signal on the target signal Sc. The buffer amplifier 36 interposed between the input terminal 40 and the ATT 32, which is an inverter in the embodiment explained above, may select the synchronization of the pulsed signal with the leading edge or the falling edge of the disable signal Tx_Disable.

Figure 5:
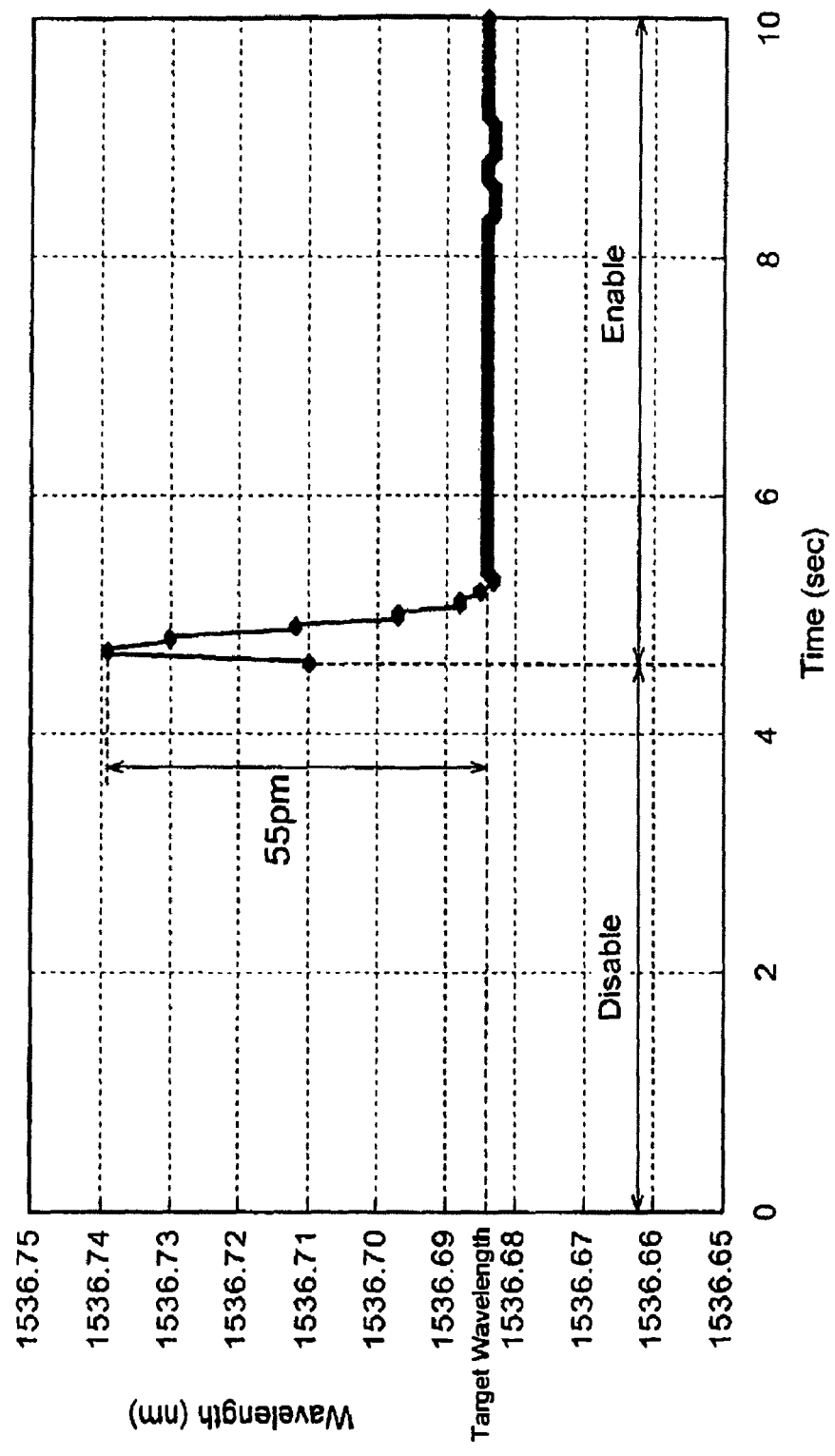
FIG. 5 shows the wavelength deviation at the start of the operation in the conventional optical transmitter.
Figure 6:
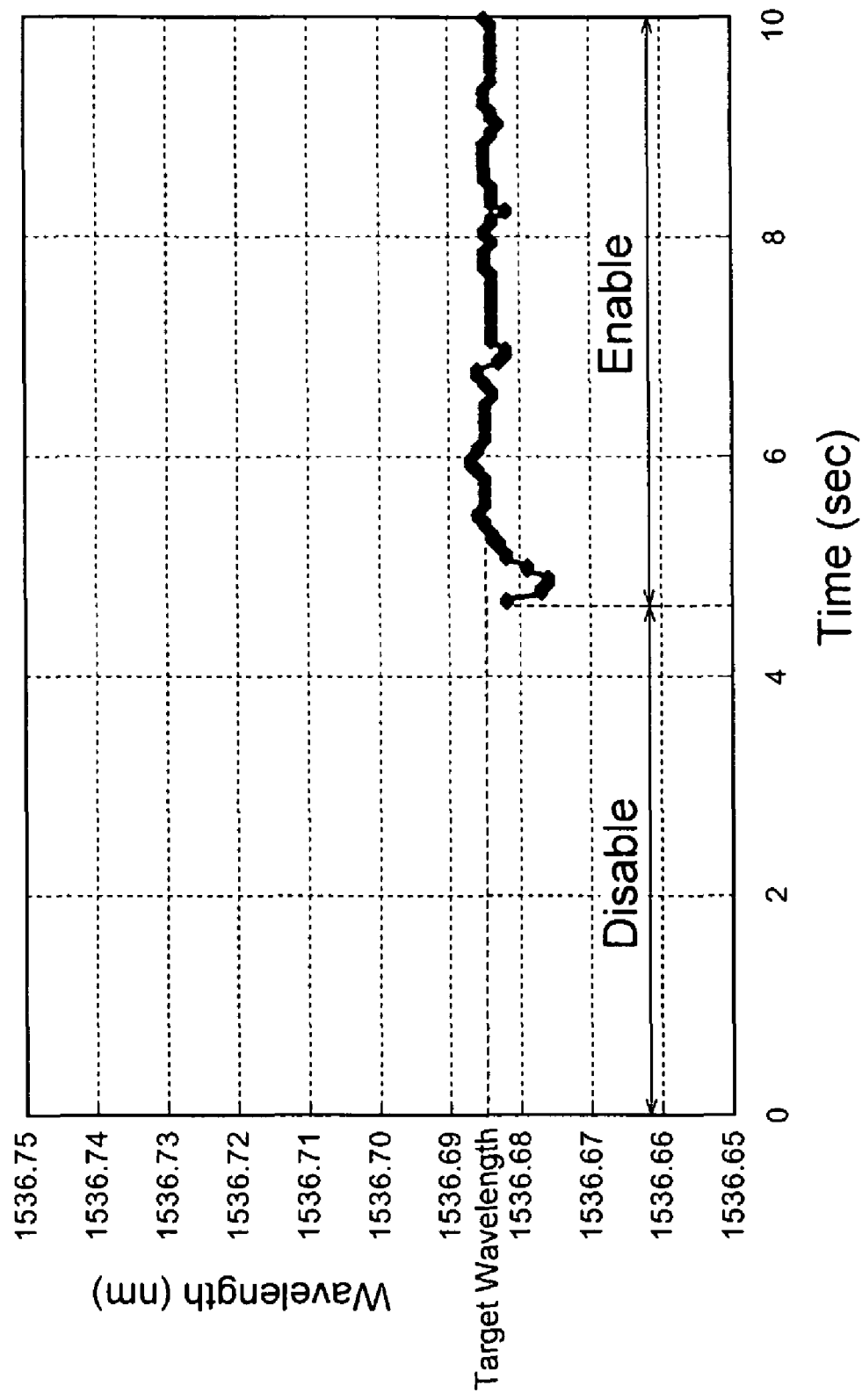
FIG. 6 shows the wavelength deviation at the start of the operation according to the present embodiment.

Next, results according to the suppressing unit 30A of the present invention will be specifically explained. FIG. 5 illustrates the wavelength fluctuation appeared in the conventional optical transmitter without any suppressing unit, while, FIG. 6 shows the behavior of the output wavelength practically observed in the optical transmitter 1A of the present invention. An exemplarily LD consumes the power of 50 mW when it is driven by a condition of the driving current 50 mA and the bias 1V. Based on this condition, the conventional optical transmitter shifts the output wavelength thereof by about 55 pm synchronized with the negation of the disable signal, as shown in FIG. 5. The dense WDM system (DWDM system) with a grid interval of 100 GHz, which is equivalent to a wavelength interval of about 800 pm, often implements a band passing filter with a narrower bandwidth of 60 to 70 GHz, equivalent to about 480 to 600 pm. When an optical transmitter applied to the DWDM system implements a function to detect a deviation in the signal wavelength, the transmitter may issue an alarm even when the signal wavelength shifts only by 10% of the grid interval. Therefore, the fluctuation of about 55 pm occurred in the conventional transmitter becomes a subject of the alarm.

On the other hand, the optical transmitter according to the present invention may provide the inverter 36 with an output swing following the CMOS logic level, namely, between 3.3 V and nearly ground level (0 V), the ATT 32 with two resistors, 32a and 32b, whose resistance are 33 k$\Omega$ and 100$\Omega$, respectively, and the differentiator 34 with the resistor 34a of 50 k$\Omega$ and the capacitor of 4.7 µF, then the output signal shown in FIG. 5 may be obtained and be added to the target signal Sb. The driving current Ip momentarily increases that enhances the capacity to cool down the LD 10 and compensates the increase of the power consumption by the LD 10, which may effectively suppress the fluctuation of the output wavelength of the LD 10 as shown in FIG. 6.

(First Modification)

Figure 7:
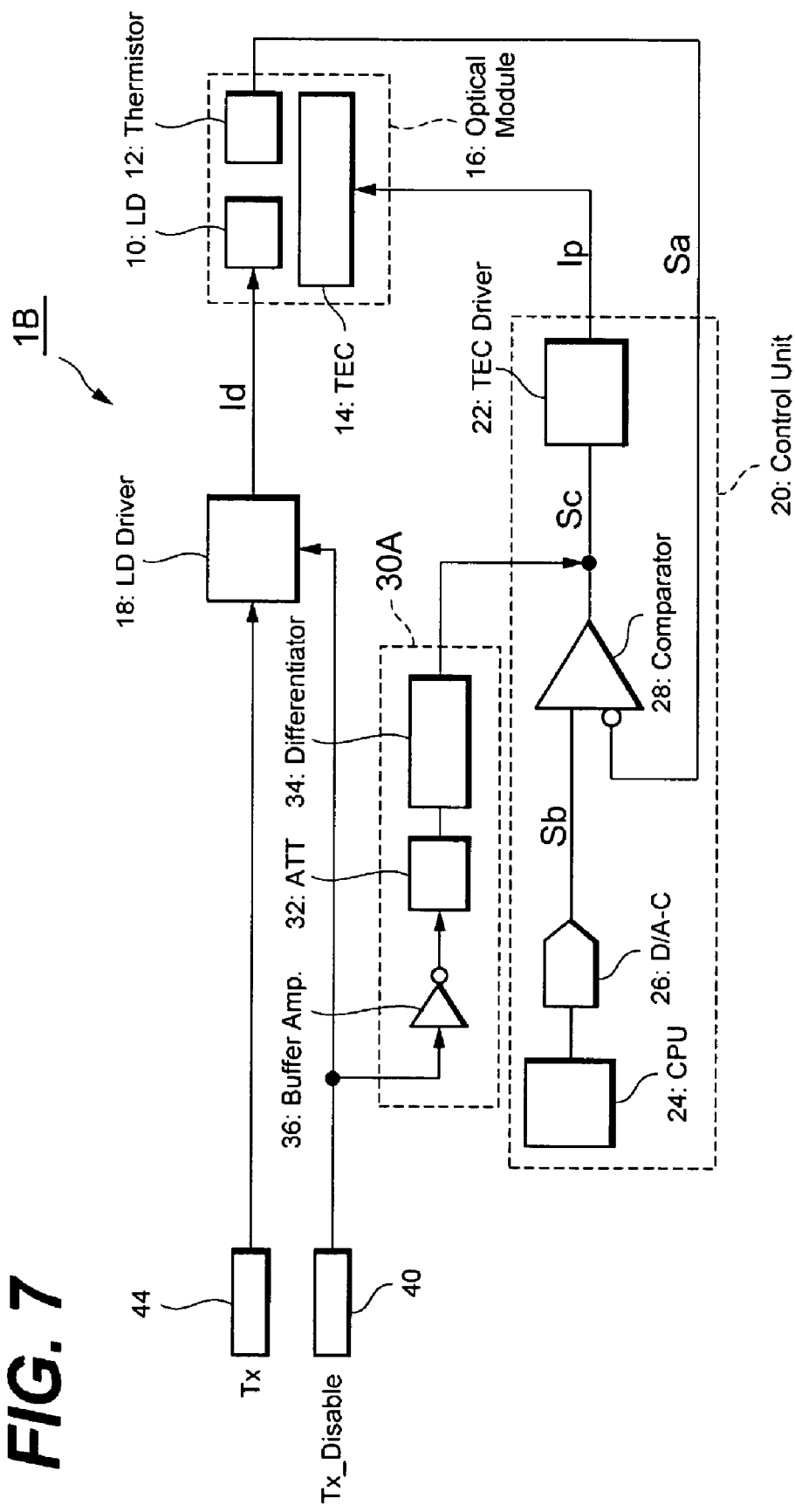
FIG. 7 is a block diagram of a modified optical transmitter according to the present embodiment of the invention.

FIG. 7 is a block diagram of an optical transmitter 1B modified from the embodiment described above. The optical transmitter 1B, compared to those configurations shown in FIG. 1 for the first transmitter 1A, modifies the node to which the output of the suppressing unit 30A is provided. The optical transmitter 1B varies, not the target signal Sb, the control signal Sc corresponding to a different between the target signal Sb and the monitored signal Sa by the output of the differentiator 34.

(Second Modification)

The suppressing unit 30A of the optical transmitters, 1A and 1B, may be modified so as to include a non-inverting buffer when the disable signal Tx_Disable is negated by a transition from the L level to the H level, opposite to the disable signal explained above. Thus, the suppressing unit 30A of the present invention may choose an inverting buffer and a non-inverting buffer depending on the logic level of the disable signal Tx_Disable.

While, this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. For instance, although the embodiments above superposes the output of the suppressing unit on the non-inverting input or the output of the amplifier to vary the driving current momentarily, the output of the suppressing unit may be led to the inventing input of the amplifier. In this case, the suppressing unit is necessary to output a negative single pulse synchronized with the negation of the disable signal Tx_Disable to decrease the sensed signal Sa, that is, the negative pulsed signal from the suppressing unit 30A simulates the increase of the LD temperature. Further, although the suppressing unit in the embodiments first attenuates the disable signal Tx_Disable and next differentiates the attenuated signal, the suppressing unit may be comprised of, first forming a pulsed signal by a one-shot multi-vibrator that outputs a signal pulse in synchronized with the edge of the disable signal Tx_Disable, and second attenuating an output of this one-shot multi vibrator.

When the ambient temperature of the LD 10 is less than the target temperature, the LD temperature may be set to the target one by reversing the direction of the driving current Ip, which heats up the LD. In this case, the pulsed output of the suppressing unit 30A functions to decrease the capacity to raise the temperature, which may compensate the increase of the power dissipation by the LD to suppress the wavelength deviation of the LD 10. It is therefore intended that the appended claims encompass any such modifications or embodiments.

What is claimed is:

1. An optical transmitter with a function to enable or to disable an optical output synchronizing with an external command, comprising:
    a laser diode configured to generate said optical output responding to said external command by providing a driving current to said laser diode;
    a feedback loop to control a temperature of said laser diode automatically, said feedback loop including a thermo-electric cooler configured to mount said laser diode thereon, a temperature sensor configured to sense a temperature of said laser diode, and a processing unit configured to compare said temperature of said laser diode sensed by said temperature sensor with a reference and to drive said thermo-electric cooler based on said comparison; and
    a unit configured to suppress a temperature deviation of said laser diode, when said optical transmitter is enabled by said external command, by superposing a pulsed signal momentarily on said feedback loop,
    wherein said unit includes an attenuator and a differentiator, said attenuator attenuating said external command, said differentiator forming said pulse signal based on said attenuated external command.

2. The optical transmitter according to claim 1, wherein said differentiator superposes said pulse signal on said reference.

3. The optical transmitter according to claim 1, wherein said differentiator superposes said pulse signal on said temperature sensed by said temperature sensor.

4. The optical transmitter according to claim 1,
wherein said processing unit includes a comparator and a current driver, said comparator being configured to compare said temperature sensed by said temperature sensor with said reference and to drive said current driver based on said comparison, said current driver driving said thermo-electric cooler, and
wherein said differentiator in said unit superposes said pulse signal on an output of said comparator.

5. A method to control an output wavelength of a laser diode whose temperature is controlled by an automatic control loop comprised of a thermo-electric control to mount said laser diode, a temperature sensor to sense a temperature of said laser diode, and a processing unit configured to compare said sensed temperature with a reference and to drive said thermo-electric cooler based on said comparison, said laser diode starting to operate by responding to an external command, said method comprising steps of:
  setting said temperature of said laser diode to be a preset value;
  receiving said external command to enable said laser diode; and
  in responding to said external command, concurrently providing a current to said laser diode and a pulsed current to said thermo-electric cooler to compensate a self heating of said laser diode due to said current provided to said laser diode,
  wherein said step to provide said pulsed current to said thermo-electric cooler includes steps of attenuating said external command, differentiating said attenuated external command to form a pulsed signal and superposing said pulsed signal on said reference to generate said pulsed current.

6. A method to control an output wavelength of a laser diode whose temperature is controlled by an automatic control loop comprised of a thermo-electric control to mount said laser diode, a temperature sensor to sense a temperature of said laser diode, and a processing unit configured to compare said sensed temperature with a reference and to drive said thermo-electric cooler based on said comparison, said laser diode starting to operate by responding to an external command, said method comprising steps of:
  setting said temperature of said laser diode to be a preset value;
  receiving said external command to enable said laser diode; and
  in responding to said external command, concurrently providing a current to said laser diode and a pulsed current to said thermo-electric cooler to compensate a self heating of said laser diode due to said current provided to said laser diode,
  wherein said step to provide said pulsed current to said thermo-electric cooler includes steps of attenuating said external command, differentiating said attenuated external command to form a pulsed signal and superposing said pulsed signal on said sensed temperature to generate said pulsed current.

7. A method to control an output wavelength of a laser diode whose temperature is controlled by an automatic control loop comprised of a thermo-electric control to mount said laser diode, a temperature sensor to sense a temperature of said laser diode, and a processing unit configured to compare said sensed temperature with a reference and to drive said thermo-electric cooler based on said comparison, said laser diode starting to operate by responding to an external command, said method comprising steps of:
  setting said temperature of said laser diode to be a preset value;
  receiving said external command to enable said laser diode; and
  in responding to said external command, concurrently providing a current to said laser diode and a pulsed current to said thermo-electric cooler to compensate a self heating of said laser diode due to said current provided to said laser diode,
  wherein said processing unit includes a comparator and a current driver, said comparator being configured to compare said temperature of said laser diode sensed by said temperature sensor with said reference and to drive said current driver based on said comparison, said current driver driving said thermo-electric cooler, and
  wherein said step to provide said pulsed current includes steps of attenuating said external command, differentiating said attenuated external command to form a pulsed signal and superposing said pulsed signal on an output of said comparator to generate said pulsed current by said current driver.

8. An optical source applied to a dense wavelength division multiplexing system, said optical source having a function to enable an optical output synchronizing with an external command, said optical source comprising:
  a laser diode to generate said optical output with a specific wavelength;
  a thermo-electric cooler mounting said laser diode thereon, said thermo-electric cooler controlling a temperature of said laser diode corresponding to said specific wavelength;
  a temperature sensor to monitor said temperature of said laser diode;
  a comparator to compare said monitored temperature of said laser diode with a reference;
  a current driver to provide a current to said thermo-electric cooler based on said comparison by said comparator, said thermo-electric cooler, said temperature sensor, said comparator and said current driver constituting an automatic temperature control loop for said laser diode; and
  a suppressing unit to suppress a deviation of said specific wavelength by a self-heating of said laser diode by a provision of a driving current in response to said external command,
  wherein said suppressing unit includes an attenuator to attenuate said external command and a differentiator to generate a pulsed signal by differentiating an output of said attenuator and to add said pulsed signal to said automatic temperature control loop.

9. The optical source according to claim 8,
wherein said differentiator adds said pulsed signal to said reference.

10. The optical source according to claim 8,
wherein said differentiator adds said pulsed signal to said monitored temperature.

11. The optical source according to claim 8,
wherein said differentiator adds said pulsed signal to an output of said comparator.

* * * * *